Oct. 23, 1956 E. D. PARKER ET AL 2,767,414
SWEEPER
Filed Nov. 19, 1949 3 Sheets-Sheet 1

INVENTORS
Edwin D. Parker and
BY Earl E. Stelzer
their Attorney

Oct. 23, 1956 E. D. PARKER ET AL 2,767,414
SWEEPER
Filed Nov. 19, 1949 3 Sheets-Sheet 3
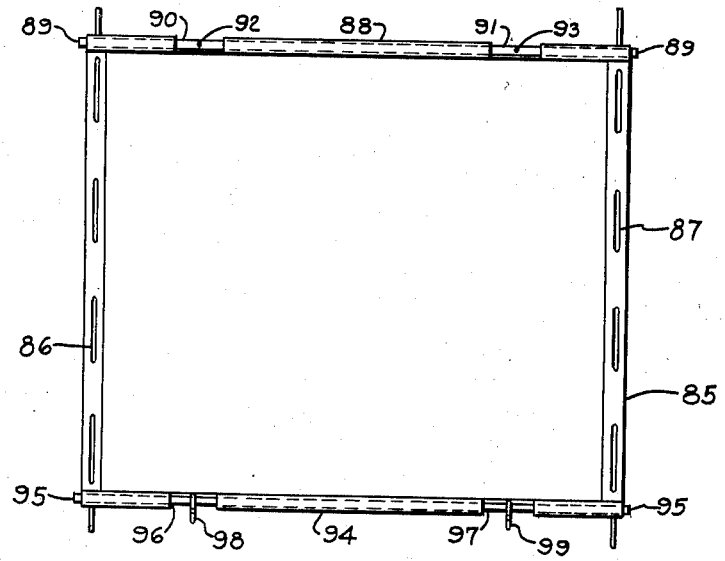
FIG. 5
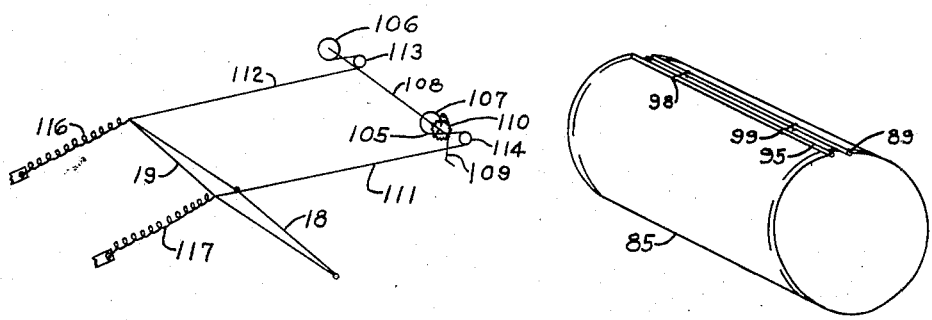
FIG. 7  FIG. 6
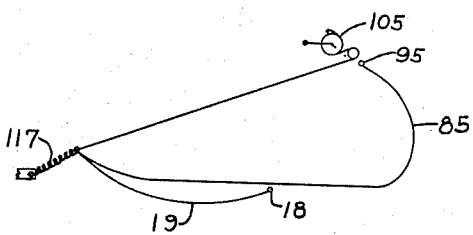
FIG. 8
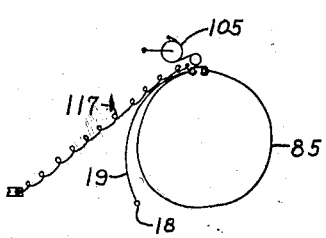
FIG. 9
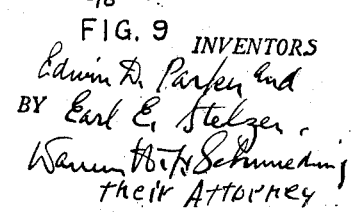
INVENTORS
Edwin D. Parker and
BY Earl E. Stelzer
Warren Body Schmeding
Their Attorney

United States Patent Office 2,767,414
Patented Oct. 23, 1956

2,767,414

SWEEPER

Edwin Dudley Parker and Earl E. Stelzer, Springfield, Ohio, assignors to Parker Sweeper Company, a corporation of Ohio Application November 19, 1949, Serial No. 128,401

5 Claims. (Cl. 15—83)

This invention relates to sweepers, and more particularly to a sweeper for collecting and handling wet or dry leaves, grass clippings, small sticks, stones and other debris from lawns, fairways and parks or the like. In general, this invention comprises a machine having a rotatably driven brush and a sheet of flexible baling material positioned to receive the debris discharged from the brush. The machine includes mechanism for raising and lowering, i. e., bringing the ends of the sheet together to form a bale which encloses the debris. This bale is removable from the machine and replaced with another baling sheet so that the operation of the machine continues with a minimum of delay. The machine is constructed so that the air flow created by movement of the machine is utilized to aid in carrying debris discharged from the brush back into the collector formed by the baling sheet.

One of the objects of this invention is to provide a sweeper of the type described in which a sheet of flexible baling material is positioned with the ends separated to form a collector for receiving debris discharged from the brush. The sheet is carried on a pivotally mounted arm adapted to separate the ends of the sheet and to bring one end of the sheet toward the other end to form a bale enclosing the debris. The sheet is provided with hooks and draw-strings at the ends and sides to fasten the bale when it is removed from the machine.

Another object of the invention is to provide a sweeper construction of the character stated having imperforate side walls and a perforate cage at the front end of the machine. With this construction the air flow created by moving the machine forward is directed through the machine and aids in carrying debris discharged from the brush back into the collector. The sheet forming the debris collector is mounted to substantially enclose the back of the machine, with the exception of an opening adjacent the top of the sheet which provides an air outlet from the machine.

It is also an object to provide means for raising and lowering the arm supporting the sheet of baling material. In one form of the construction the means provided comprises a lever connected to the arm, and in another form comprises a windlass and spring arrangement. Either construction is adapted to raise a heavy load of debris to the baling position with a minimum of effort by the operator.

An additional object is to provide improved means for raising and lowering the brush relative to the surface being cleaned. In one form of the construction the means provided comprises a pivotally mounted lever connected to the side plates, and in another form comprises a threaded adjustment mechanism connected to the main frame and the top cross tie rod.

Further objects and advantages of the present invention will be apparent from the following description, reference being had to the accompanying drawings wherein preferred forms of embodiments of the invention are clearly shown.

In the drawings:

Fig. 5 is a top elevational view showing the construction of the sheet of baling material which forms the debris collector in the machine;

Fig. 6 is a perspective view of the sheet having the ends drawn together to form a bale enclosing the debris, and illustrating the form in which the bale is removed from the machine;

Fig. 7 is a diagrammatic perspective view of the pivotally mounted arm for the baling sheet and showing the windlass for raising the arm and the spring connection for lowering the arm;

Fig. 8 is a diagrammatic side view illustrating the arm in its lowered position with the baling sheet attached and in position to receive debris from the brush;

Fig. 9 is a view similar to Fig. 8 showing the arm in the raised position which brings the ends of the baling sheet together to form the bale enclosing the debris for removal from the machine.

Figure 1:
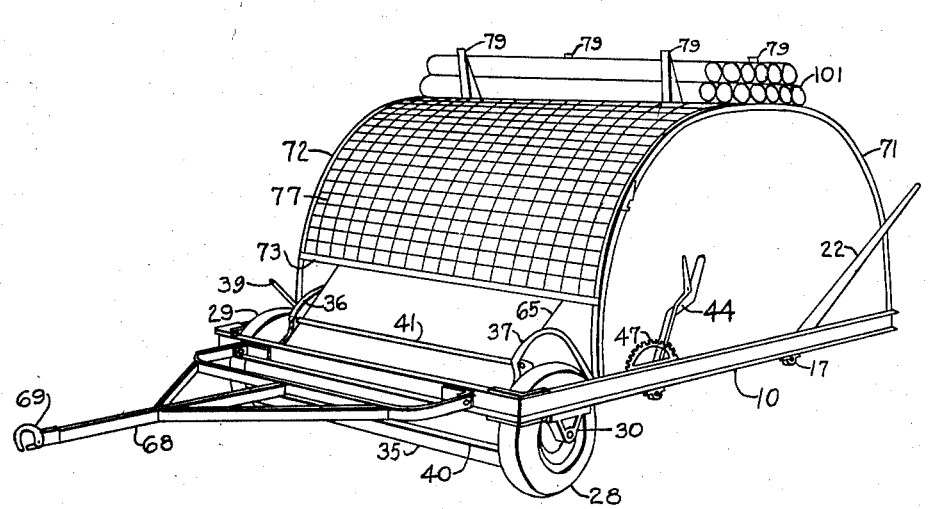
Fig. 1 is a perspective view of a machine embodying the present invention.
Figure 4:
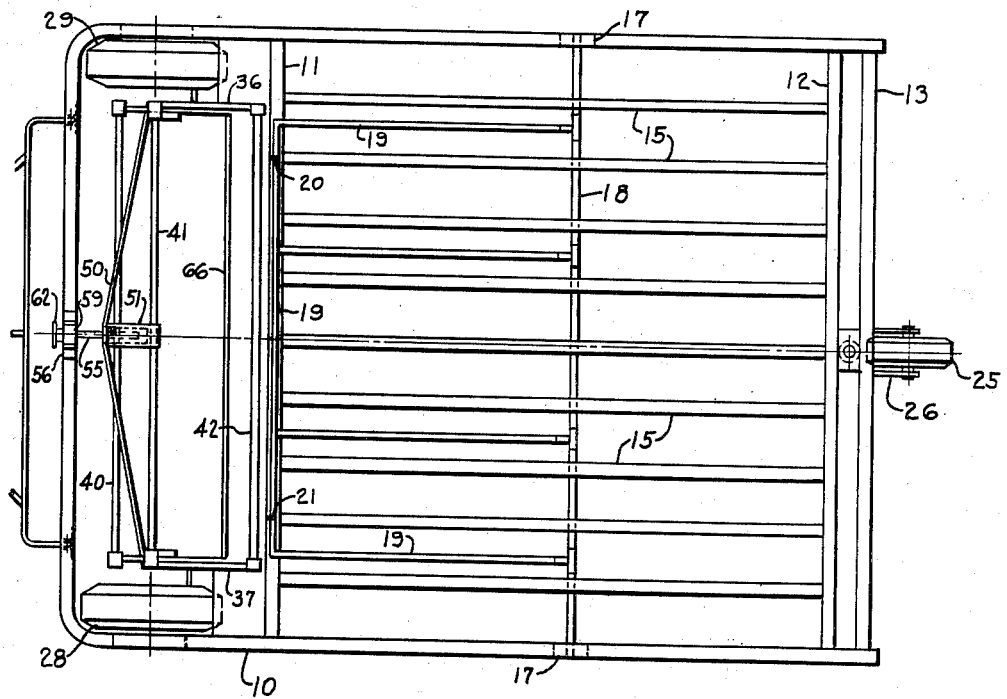
Fig. 4 is a top elevational view of the machine illustrated in Fig. 3 with the baling sheet removed.

Referring further to the drawings, the machine shown in Fig. 1 is provided with a frame 10 formed of channel iron. This frame, as seen in Fig. 4, is substantially a one-piece rectangular shaped construction having cross braces 11, 12 and 13 welded in position. Longitudinally extending supporting members, as indicated at 15, are supported on the cross braces.

Figure 2:
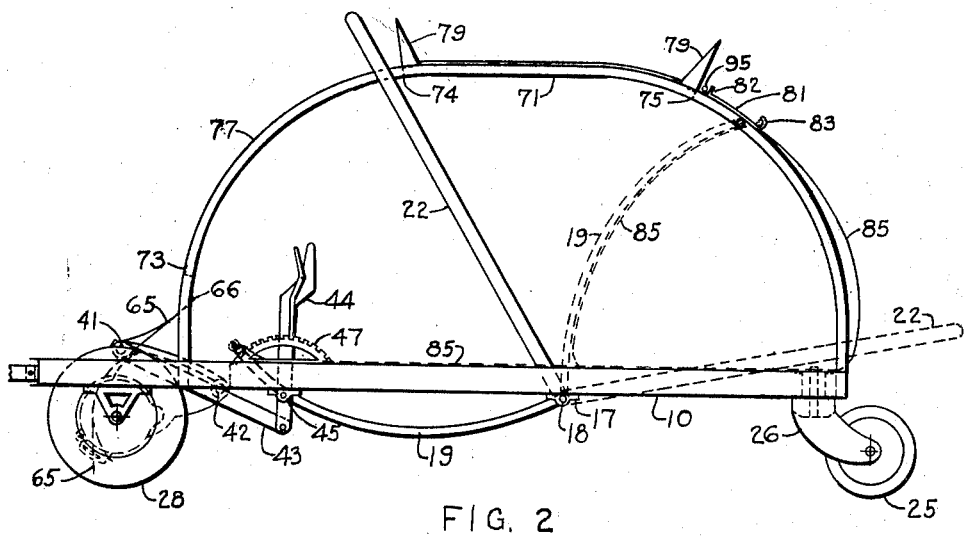
Fig. 2 is a side elevational view of the machine shown in Fig. 1.

A bracket 17 is fastened to the underside of the frame 10 on each side. These brackets form supports for the pivotally mounted rod 18. A bowed-shaped arm 19 is connected to rod 18 as shown in Fig. 4. Arm 19 extends between the supporting members 15. At its outer end arm 19, when in its lowered position, is supported on the cross brace 11. A pair of pins 20 and 21 project outwardly from the end of arm 19 as seen in Fig. 4. The lever 22, Fig. 2, is connected to the outer end of rod 18 and provides for rotating rod 18 to raise or lower the arm 19. Arm 19 is shown in its lowered position with the full lines in Fig. 2 and in the raised position in dotted lines.

The frame 10 is supported at the rear on a wheel 25. This wheel is provided with a caster mounting 26 which allows the wheel to swivel freely with respect to the frame. The upper end of the mounting 26 is connected to the frame between the cross braces 12 and 13. The frame 10, at the front, is supported on a pair of oppositely disposed wheels 28 and 29. The axles for wheels 28 and 29 are journalled in hangers, as indicated at 30 in Fig. 1, connected to the underside of the frame.

The brush for sweeping the surface over which the machine travels is indicated generally at 35, Fig. 1. The brush extends across the front of the machine between the wheels 28 and 29, being supported on a brush reel carried by the side plates 36 and 37. These plates are pivotally mounted and adjustable with respect to the wheels 28 and 29 so that the height of the brush can be raised or lowered relative to the surface to be cleaned. The wheels 28 and 29 drive the brush reel through a ratchet and pawl which engage with a drive gear and pinion in each wheel. The brush reel is equipped with a clutch, operated by means of the hand lever 39 from the outside of the sweeper, to engage and disengage the brush reel driving connection with the wheels.

A front tie rod 40 and a top tie rod 41, Fig. 4, connect the plates 36 and 37. These plates are connected at the rear with the tie rod 42. An arm 43 is pivotally connected at one end to the tie rod 41. The other end of arm 43 is pivotally connected to the bottom of lever 44. Lever 44 in turn is pivotally connected to the cross rod 45 carried in a bracket connected on each side to the underside of frame 10. A pawl and ratchet, indicated generally at 47, provides for adjustably positioning the lever 44. With this construction, movement of the lever in one direction shifts the arm 43 and causes the plates 36 and 37 to rotate and lower the brush. Movement of lever 44 in the opposite direction rotates the side plates in the reverse direction and raises the brush.

Figure 10:
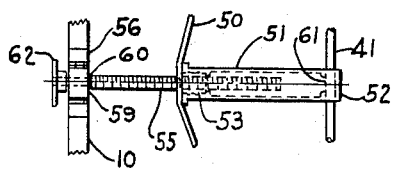
Fig. 10 is a broken, horizontal sectional view, partly in elevation, of the screw threaded mechanism for adjusting the brush.
Figure 3:
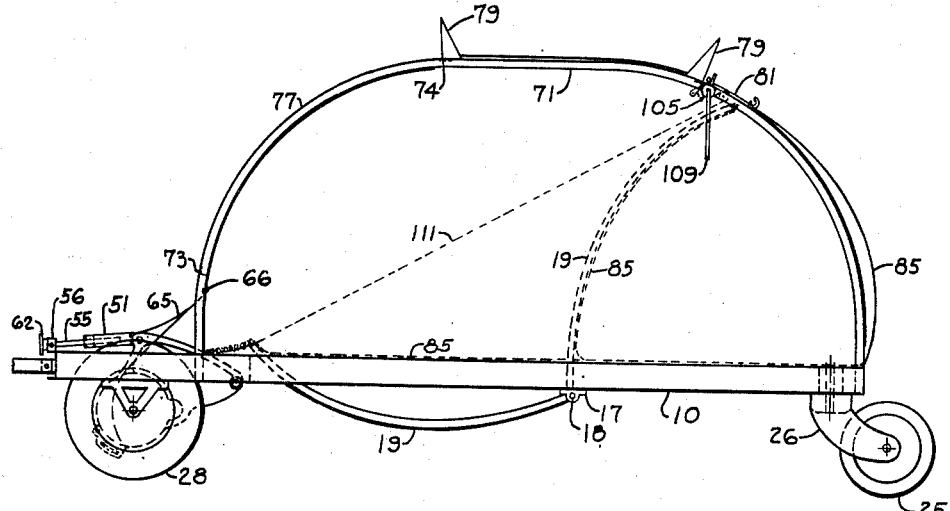
Fig. 3 is a side elevational view of a modified construction showing a windlass for raising the arm supporting the baling material and a screw type adjusting means for raising and lowering the brush.

A modified construction for adjustably positioning the height of the brush is shown in Figs. 3, 4 and 10. In this arrangement a bow-shaped support 50 extends across the front of the machine between the side plates. This support is connected at each of its ends to the top tie rod 41. A housing 51 is connected at one end to the mid point of the support. At the other end, housing 51 is pivotally connected to the tie rod 41 as indicated at 52. As seen in Fig. 10, the housing 51 is provided with a threaded insert 53. A worm member 55 engages with the insert 53 and extends within the housing as shown. A bracket 56, formed from a pair of angle irons, is fastened to the frame 10. A pivot block 59 is carried by the bracket 56 and supports the reduced outer end of the worm member 55. The shoulder 60 provides a stop limiting the longitudinal movement of the worm in one direction when the shoulder engages againts the pivot block 59. A hand wheel 62 having a collar 63 is connected to the outer end of worm 55 to facilitate its rotation. The collar 63 limits the longitudinal displacement of the worm in the opposite direction when the collar engages block 59. In operation, the rotation of the worm 55 in one direction causes the housing 51 and support 50 to be moved outwardly toward the front of the machine. This movement is transmitted to move the side plates in a direction which, for example, lowers the position of the brush. Rotation of the worm in the opposite direction moves the housing and support 50 inwardly and reverses the movement of the side plates to raise the brush.

An adjustable hood 65 is slidably mounted forward of and above the brush. This hood provides for directing debris discharged against it by the clockwise rotation of the brush back into the machine. As shown in Figs. 1 and 2, this hood is guided between the side plates 36 and 37. At its upper end, the hood is provided with a finger grip 66 to facilitate raising and lowering. In operation, this hood is adjusted so that its lower end is close to the surface over which the brush passes and prevents debris from being discharged in front of the machine. A braced tongue 68, Fig. 1, is attached to the frame at the front of the machine. A latch type of hitch 69 is provided on the tongue so that the machine can be connected to a tractor, or other source of motive power.

Arcuate shaped side frames 71 and 72 are disposed on opposite sides of the frame 10. These frames are covered with sheet metal and form imperforate side walls. Cross braces of angle iron 73, 74 and 75 are connected between the side frames as shown in Fig. 2. A wire mesh screen 77 is attached to the cross braces 73, 74 and 75 and forms a cover or cage enclosing the front end of the machine between the side walls which extends back across the top. The top edge of the hood 65 extends under brace 73. The screen 77 provides for deflecting and directing debris from the brush back into the machine. The screen 77 also forms an air inlet passage at the front of the machine. Brackets, indicated at 79, welded to flat strips attached between the braces 74 and 75 form a carrying rack on each side of the machine. A bracket 81 is supported on the top edge of each of the side frames 71 and 72 close to the rear end of the racks formed by a bracket 79. This bracket is formed with one end turned up at right angles, as indicated at 82, and the other end curved as at 83, Fig. 2. The end 82 of each bracket 81 is spaced close to the rearmost bracket 79 and provides a support which carries the ends of the cross rod 95, more fully described later.

A sheet of flexible baling material 85, formed of heavy canvas for example, is supported between the side walls to form a collector for receiving debris discharged from the brush. This sheet is positioned in the machine so as to be oppositely disposed from the front wall, and with the ends of the sheet separated provides for substantially enclosing the area between the side walls. As seen in Fig. 5, this sheet is constructed with the side edges folded over and sewed flat. These edges are provided with a plurality of perforations through which the draw ropes, indicated at 86 and 87, are strung. The top edge 88 of the sheet is folded and sewed to form a loop through which the front cross rod 89 extends. The front edge of the sheet is cut away to expose the rod 89, as indicated at 90 and 91. The rod 89 is provided with drilled openings 92 and 93 spaced to lie within cut away portions 90 and 91. These openings 92 and 93 are spaced so that the rod can be fastened over the pins 20 and 21 on the arm 19. The rear edge 94 of the sheet is similarly folded and sewed to form a loop which receives the top or back cross rod 95. This edge of the sheeet is cut away, as indicated at 96 and 97, to expose the rod 95. Rod 95 is drilled to receive a pair of hooks 98 and 99 which are fastened within the cut away portions 96 and 97. Thus when the front and back edges of sheet 85 are raised and brought together, the hooks 98 and 99 can be looped over the front rod 89 to hold the edges together to form a bale as shown in Fig. 6. The draw ropes 86 and 87 can then be pulled and tied to close the ends of the bale if so desired.

In operation, sheet 85 is placed in the machine with the front rod 89 held by the pins 20 and 21 on the arm 19. The top or back cross rod 95 is positioned between the sidewalls with the ends of the rod carried by the end 82 of the bracket 81. Sheet 85 thus forms a collector which has the front end supported directly on the members 15 as indicated in Fig. 2. The rear of sheet 85 is held in the raised position by rod 95. When the collector thus formed is full of debris, the operating lever 22, Fig. 2, is moved to the dotted line position. This movement raises the arm 19 and brings the rod 89 up to the rod 95, which brings the front and rear edges of the sheet together, so that the hooks 98 and 99 can be fastened over rod 89 to hold the edges together. To facilitate connecting the rods 89 and 95 together with the hooks 98 and 99, the operator lifts the rod 95 away from the bracket end 82 and places the ends of rod 95 within the hook portions 83. With rod 95 in this lower position on the brackets 81, the arm 19 raises the rod 89 close enough to rod 95 to facilitate connecting the hooks 98 and 99 to rod 89. The operator then removes the bale from the machine. A plurality of sheets 101, identical to sheet 85, are rolled and carried on top of the machine in the racks formed by the brackets 79. The rolls of extra sheets cover the top of cage 77 in the area between the cross members 74 and 75 and thus provide for directing the air flow from the front of the machine out through the back in the area between the cross brace 75 and the top of rod 95 when the latter is carried on the end 82 of the bracket 81. The open space between the rolls 101 and rod 95 forms an air outlet passage. This passage is kept as narrow as possible to aid in creating and directing an air flow through the machine. This air flow, created by the movement of the machine as it is pulled forward, aids in carrying the debris discharged from the brush back into the collector formed by sheet 85.

A modified construction for raising and lowering the arm 19 is illustrated in Fig. 3. In this form a windlass, indicated generally at 105, is provided to raise the arm 19. The windlass includes a pair of pulleys 106 and 107, Fig. 7, rotatably mounted on the side walls 71 and 72. These pulleys are connected by the shaft 108. A hand crank 109 is connected to shaft 108 and provides for rotating the pulleys. A pawl and ratchet 110 is provided to control the direction of rotation. Steel cables 111 and 112 are connected to the outer ends of the arm 19. These cables extend back around pulleys 113 and 114, mounted on the side walls 71 and 72, and then are wrapped around the pulleys 106 and 107, Fig. 7. Tension springs 116 and 117 are connected to the outer ends of arm 19 and to the frame at the front of the machine as shown in Fig. 7. When the crank 109 is turned so that the cables 111 and 112 are wound up on the pulleys 106 and 107, arm 19 is raised. This movement of arm 19 brings the ends of the baling sheet 85 together as shown in Fig. 9. This movement of the arm also extends the springs 116 and 117. The bale is removed and another sheet is fastened to arm 19 while the arm is in the raised position, as previously described. The extended springs 116 and 117 retract when the ratchet 110 is released and pull the arm 19 and attached sheet back into the position shown in Fig. 8.

From the above description it will be apparent that a trailer type of vehicle is provided for sweeping and cleaning large surface areas. The machine is provided with a semicircular wire mesh screen which extends substantially across the front and top. The back of the machine is open and supports a large, substantially rectangular, sheet of baling material which collects the debris discharged from the rotating brushes at the front of the machine. When the collector, formed by the sheet, is filled with debris, an arm carrying the lower or bottom edge of the sheet is raised with a lifting mechanism from the outside of the machine. Raising this arm brings the top and bottom edges of the sheet together. The operator can then fasten the edges together to form a bale. This bale is removed from the machine and a new sheet installed for further collections. In operation, the air flow created by forward movement of the trailer is directed through the screen at the front and discharged from the back of the machine. This air flow aids in carrying the debris discharged from the brush back into the sheet.

While the forms of embodiments of the present invention as herein disclosed constitute preferred forms, it is to be understood that other forms might be adopted, all coming within the scope of the claims which follow:

We claim:

1. In combination, a sweeper having a rotatable brush; means for rotating the brush; means for manipulating the sweeper; a support; a debris receptacle positioned to receive debris discharged from the brush, said receptacle including side walls, and a floor, said floor including a sheet of flexible baling material carried by the support with one end of the sheet separated from the other end of the sheet; means providing for the passage of air over the brush to aid in carrying debris back into the receptacle; and means for moving the support to bring the separated ends of the sheet together to form a bale, said bale being removable from the sweeper.

2. In combination, a sweeper having a rotatable brush; means for rotating the brush; means for manipulating the sweeper; a frame having a pair of oppositely disposed side walls; a sheet of flexible baling material supported between the side walls to form a collector for receiving debris discharged from the brush; an air inlet passage and an air outlet passage providing for a flow of air between the side walls to aid in carrying debris discharged from the brush into the collector; and means for moving one end of the sheet towards the other end of the sheet to form a bale, said bale being removable from the sweeper.

3. In combination, a sweeper having a rotatable brush; means for rotating the brush; means for manipulating the sweeper; a frame having a pair of oppositely disposed side walls; a sheet of flexible baling material supported between the side walls to form a collector for receiving debris discharged from the brush; a perforate cage for deflecting said debris substantially enclosing the forward end of the sweeper; an air outlet passage in the rear of the sweeper to provide for establishing a flow of air entering through said cage to aid in carrying said debris into the sheet; and means for moving one end of the sheet toward the other end of the sheet to form a bale, said bale being removable from the sweeper.

4. In combination, a sweeper having a rotatable brush; means for rotating the brush; means for manipulating the sweeper; a frame having substantially imperforate side walls and a perforate front wall; a sheet of flexible baling material supported between the side walls to form a collector for receiving debris discharged from the brush, said sheet being oppositely disposed from the front wall with the ends of the sheet separated to provide for substantially enclosing the area between the side walls; an air outlet passage to provide for establishing a flow of air from the front wall to the sheet to aid in carrying the debris discharged from the brush; and means for moving one end of the sheet toward the other end of the sheet to form a bale, said bale being removable from the sweeper.

5. In combination, a sweeper having a rotatable brush; means for rotating the brush; means for manipulating the sweeper; a frame; a sheet of flexible baling material supported opposite the brush to form a collector for receiving debris discharged from the brush; a cage supported by the frame for deflecting said debris and providing an air inlet passage from the front of the sweeper whereby the air flow created by the forward movement of the sweeper aids in carrying said debris into the sheet; an air outlet passage adjacent one end of the sheet; and means for moving one end of the sheet toward the other end of the sheet to form a bale, said bale being removable from the sweeper.

References Cited in the file of this patent

UNITED STATES PATENTS

| | | |
|---|---|---|
| 572,980 | Gordon | Dec. 15, 1896 |
| 605,385 | Brown | June 7, 1898 |
| 622,372 | Langworthy | Apr. 4, 1899 |
| 857,415 | Pum | June 18, 1907 |
| 1,223,542 | Webster | Apr. 24, 1917 |
| 1,229,127 | Osborne | June 5, 1917 |
| 1,313,228 | Minnich | Aug. 12, 1919 |
| 1,368,134 | Gilchrist | Feb. 8, 1921 |
| 2,121,786 | Carroll | June 28, 1938 |
| 2,183,910 | Henrici | Dec. 19, 1939 |
| 2,407,430 | MacRae | Sept. 10, 1946 |